US012744755B2

(12) United States Patent
Mishra et al.

(10) Patent No.: US 12,744,755 B2
(45) Date of Patent: Sep. 22, 2026

(54) NETWORK FUNCTION LOCATOR

(71) Applicant: DISH Network Technologies India Private Limited, Bangalore (IN)

(72) Inventors: Brijesh Mishra, Bangalore (IN); Ankesh Arora, Bangalore (IN)

(73) Assignee: DISH Network Technologies India Private Limited (IN)

( * ) Notice: Subject to any disclaimer, the term of this patent is extended or adjusted under 35 U.S.C. 154(b) by 245 days.

(21) Appl. No.: 18/761,067

(22) Filed: Jul. 1, 2024

(65) Prior Publication Data

US 2026/0005999 A1 Jan. 1, 2026

(51) Int. Cl.

*H04L 61/45* (2022.01)
*H04L 65/1016* (2022.01)
*H04W 8/18* (2009.01)

(52) U.S. Cl.

CPC ...... *H04L 61/4547* (2022.05); *H04L 65/1016* (2013.01); *H04W 8/186* (2013.01)

(58) Field of Classification Search

CPC . H04L 61/4547; H04L 65/1016; H04W 8/186
See application file for complete search history.

(56) References Cited

U.S. PATENT DOCUMENTS

2022/0086218 A1* 3/2022 Sabella ................ H04M 15/66

* cited by examiner

*Primary Examiner* — Curtis B Odom
(74) *Attorney, Agent, or Firm* — Kipman T. Werking; Frontier IP Law PLLC

(57) ABSTRACT

A disclosed method may include (i) receiving identifying input identifying a client receiving telecommunication service through a cloud-native mobile network that is operated by a mobile operator and that is implemented at least in part through a cloud computing platform that divides itself into at least a plurality of different zones and (ii) executing a programming script using the identifying input to further identify a zone, from among the plurality of zones, that contains an instance of a network function that is implemented on the cloud computing platform and that is actively serving the client.

20 Claims, 9 Drawing Sheets

700

NETWORK FUNCTION LOCATOR

BRIEF SUMMARY

This disclosure is generally directed to systems, methods, and computer-readable media relating to a network function locator. In the modern environment of mobile operators, including mobile operators that are administering fifth-generation and beyond cellular networks, various components of these respective networks can be implemented as network functions. For example, a fifth-generation network core may include network functions such as an access and mobility function, a session management function, an evolved packet data gateway, a subscriber data management function, or a session management function.

Additionally, in this modern environment of mobile operators, some mobile operators are implementing at least part of their cellular networks on third-party cloud computing platforms, such as those provided by Google and Microsoft. The use of third-party cloud computing platforms inherently creates a layer of abstraction that can result in challenges for the mobile operators when attempting to understand or gain visibility into network operations (i.e., because the third-party cloud computing platforms may have greater visibility into, or understanding of, certain aspects of their own resources on which the cellular networks execute). By way of illustrative example, a particular network function, such as an access and mobility function, may be actively serving a particular client, and yet the mobile operator may not necessarily have immediate access to the location of this particular network function. The problem of locating particular network functions that are actively serving a particular client can become more cumbersome with the evolution of technology and the increasing number of network functions in fifth-generation and beyond cellular networks. Accordingly, this disclosure describes various embodiments that may help to address or improve these inefficiencies. Additional benefits that are associated with these various embodiments are discussed in further detail below.

In some examples, a method includes (i) receiving identifying input identifying a client receiving telecommunication service through a cloud-native mobile network that is operated by a mobile operator and that is implemented at least in part through a cloud computing platform that divides itself into at least a plurality of different zones, (ii) executing a programming script using the identifying input to further identify a zone, from among the plurality of zones, that contains an instance of a network function that is implemented on the cloud computing platform and that is actively serving the client, (iii) outputting a result of executing the programming script such that the mobile operator is enabled to further identify the zone, from among the plurality of zones, that contains the instance of the network function that is implemented on the cloud computing platform and that is actively serving the client. In various ones of these examples, the programming script identifies the zone by performing, for each respective zone in a set of multiple zones from the plurality of zones: (i) logging into a pod for the network function in the respective zone on the cloud computing platform, (ii) executing on the pod a command at least in part by referencing the identifying input identifying the client, and (iii) reporting whether a response from the pod in response to the command indicates that the pod contains the instance of the network function that is actively serving the client such that the instance of the network function is located.

In some examples, the identifying input identifying the client receiving telecommunication service comprises an international mobile subscriber identity.

In some examples, the programming script accepts as input a set of multiple distinct network functions and at least a portion of the programming script is repeated for each network function in the set of multiple distinct network functions such that an instance serving the client is located for each of the multiple distinct network functions.

In some examples, the network function is part of the Internet Protocol multimedia subsystem.

In some examples, the network function comprises a call session control function, a proxy call session control function, or a telephony application server.

In some examples, the network function is part of the 5G core.

In some examples, the network function comprises an access and mobility management function, a user plane function, an evolved packet data gateway, a subscriber data management, or a session management function.

In some examples, executing the programming script comprises invoking a function that accepts the identifying input identifying the client as input and performs reporting whether the response from the pod in response to the command indicates that the pod contains the instance of the network function that is actively serving the client such that the instance of the network function is located.

In some examples, the method further includes, for at least one zone in the set of multiple zones, logging out of the pod in the respective zone on the cloud computing platform prior to logging into a next pod for another zone in the multiple zones.

In some examples, the zones comprise at least two of w2az1, w2az2, e1az2, e1az4, e2az1, and e2az2.

In some examples, outputting the result comprises outputting a namespace for the network function, a particular zone for the network function, or a name of a particular pod containing the network function.

In some examples, reporting whether the response from the pod in response to the command indicates that the pod contains the instance of the network function that is actively serving the client comprises defining a character pattern including the keyword REGISTER.

In some examples, reporting whether the response from the pod in response to the command indicates that the pod contains the instance of the network function that is actively serving the client comprises checking whether the response includes the character pattern.

In some examples, executing the programming script enables a user to further identify the zone with a single input click.

In some examples, the programming script identifies the zone by performing, for each respective zone in the set of multiple zones from the plurality of zones, logging out of the pod for the respective network function in the respective zone.

In some examples, the command checks for a number of packet data unit sessions for the client connected to the pod for the network function.

In some examples, a system includes at least one physical computing processor of a computing device and a non-transitory computer-readable medium that has instructions stored thereon that, when executed by the at least one physical computing processor, cause the computing device to perform operations comprising: (i) receiving identifying input identifying a client receiving telecommunication service through a cloud-native mobile network that is operated by a mobile operator and that is implemented at least in part through a cloud computing platform that divides itself into at least a plurality of different zones, (ii) executing a programming script using the identifying input to further identify a zone, from among the plurality of zones, that contains an instance of a network function that is implemented on the cloud computing platform and that is actively serving the client, and (iii) outputting a result of executing the programming script such that the mobile operator is enabled to further identify the zone, from among the plurality of zones, that contains the instance of the network function that is implemented on the cloud computing platform and that is actively serving the client. In various ones of these examples, the programming script identifies the zone by performing, for each respective zone in a set of multiple zones from the plurality of zones: (i) logging into a pod for the network function in the respective zone on the cloud computing platform, (ii) executing on the pod a command at least in part by referencing the identifying input identifying the client, and (iii) reporting whether a response from the pod in response to the command indicates that the pod contains the instance of the network function that is actively serving the client such that the instance of the network function is located.

In some examples, a non-transitory computer-readable medium has instructions stored thereon that, when executed by at least one physical computing processor, cause a computing device to perform operations comprising: (i) receiving identifying input identifying a client receiving telecommunication service through a cloud-native mobile network that is operated by a mobile operator and that is implemented at least in part through a cloud computing platform that divides itself into at least a plurality of different zones, (ii) executing a programming script using the identifying input to further identify a zone, from among the plurality of zones, that contains an instance of a network function that is implemented on the cloud computing platform and that is actively serving the client, and (iii) outputting a result of executing the programming script such that the mobile operator is enabled to further identify the zone, from among the plurality of zones, that contains the instance of the network function that is implemented on the cloud computing platform and that is actively serving the client. In various ones of these examples, the programming script identifies the zone by performing, for each respective zone in a set of multiple zones from the plurality of zones: (i) logging into a pod for the network function in the respective zone on the cloud computing platform, (ii) executing on the pod a command at least in part by referencing the identifying input identifying the client, and (iii) reporting whether a response from the pod in response to the command indicates that the pod contains the instance of the network function that is actively serving the client such that the instance of the network function is located.

BRIEF DESCRIPTION OF THE DRAWINGS

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
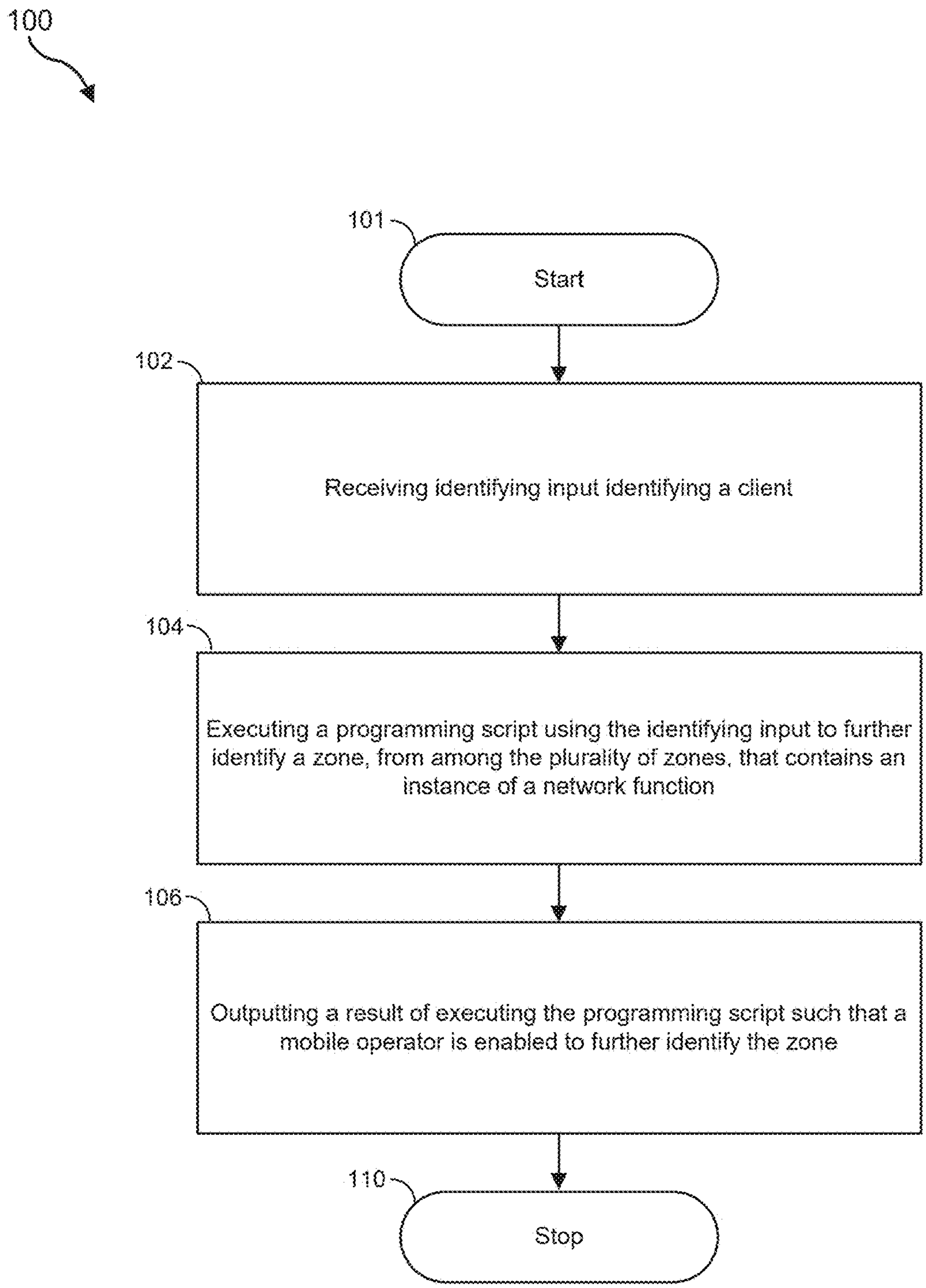
FIG. 1 shows a flow diagram for a method relating to a network function locator.

FIG. 1 shows a flow diagram for a method 100 relating to a network function locator. At step 101, method 100 may start or begin. At step 102, method 100 may include receiving identifying input identifying a client receiving telecommunication service through a cloud-native mobile network that is operated by a mobile operator and that is implemented at least in part through a cloud computing platform that divides itself into at least a plurality of different zones. At step 104, method 100 may include executing a programming script using the identifying input to further identify a zone, from among the plurality of zones, that contains an instance of a network function that is implemented on the cloud computing platform and that is actively serving the client. At step 106, method 100 may include outputting a result of executing the programming script such that the mobile operator is enabled to further identify the zone, from among the plurality of zones, that contains the instance of the network function that is implemented on the cloud computing platform and that is actively serving the client. In various ones of these examples, the programming script identifies the zone by performing, for each respective zone in a set of multiple zones from the plurality of zones: (i) logging into a pod for the network function in the respective zone on the cloud computing platform, (ii) executing on the pod a command at least in part by referencing the identifying input identifying the client, and (iii) reporting whether a response from the pod in response to the command indicates that the pod contains the instance of the network function that is actively serving the client such that the instance of the network function is located. At step 110, method 100 may stop or conclude.

Figure 2:
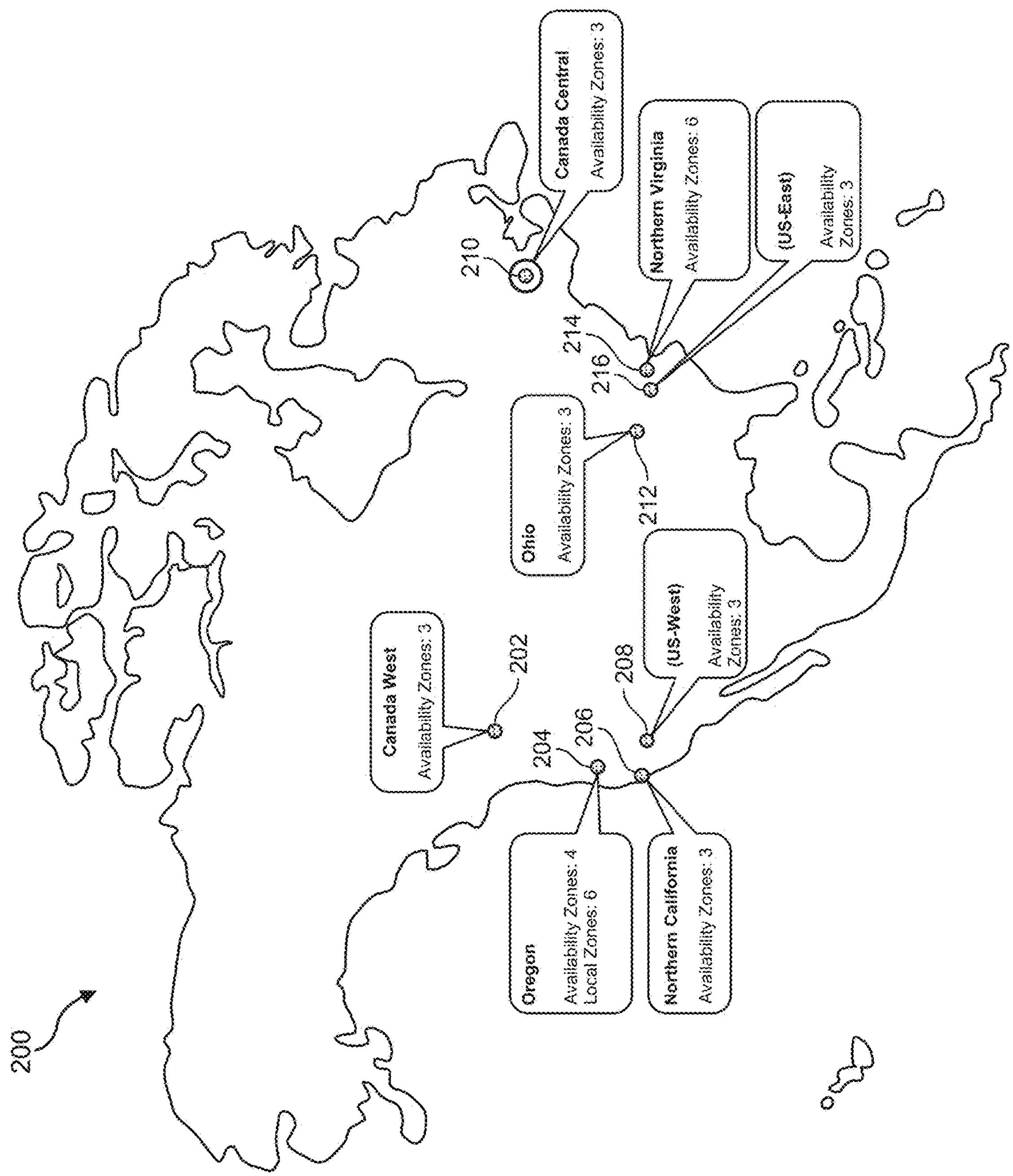
FIG. 2 shows a map of geographic locations for corresponding availability zones within a cloud computing platform.

FIG. 2 shows a map or diagram 200 of geographic locations for corresponding availability zones within a cloud computing platform. As shown within diagram 200, an example cloud computing platform (e.g., a cloud computing platform provided by Amazon) may have a number of distinct regions where one or more data centers are located. These regions may include a region 202, a region 204, a region 206, a region 208, a region 210, a region 212, a region 214, and a region 216, as shown. Moreover, diagram 200 also further illustrates how each one of multiple distinct regions may itself contain multiple availability zones. For example, diagram 200 indicates that region 202 includes three separate availability zones. Similarly, diagram 200 indicates that region 204 includes four different availability zones. The remaining availability zones in diagram 200 similarly indicate a number of distinct and corresponding availability zones in a parallel manner, as shown. In general, an availability zone in the context of cloud computing can refer to a subset of an information technology infrastructure system that has a level of redundancy in terms of service-critical components, such as power, cooling, and/or access, from other availability zones. Those having skill in the art understand that technology companies such as Amazon, Microsoft, and Google provide cloud computing platforms with respective availability zones or zones, which the companies have self-identified and publicized to customers, and the disclosure herein generally can use the term "availability zone" or "zone" consistent with the usage of these terms within this context.

Notably, although diagram 200 may show all of the regions and/or availability zones that are included within the cloud computing platform of a technology company at a particular point in time, not all of these regions may be utilized or partnered with the mobile operator that is implementing the telecommunication network of method 100. Accordingly, even though a particular technology company may have a multitude of different regions (e.g., the eight regions of diagram 200), when searching for a network function according to method 100, the search may be constrained to only those regions and/or those availability zones that are used by the mobile operator, as discussed in more detail below. Similarly, the mobile operator may constrain the search to a set of regions and/or availability zones according to its own preferences.

Figure 3:
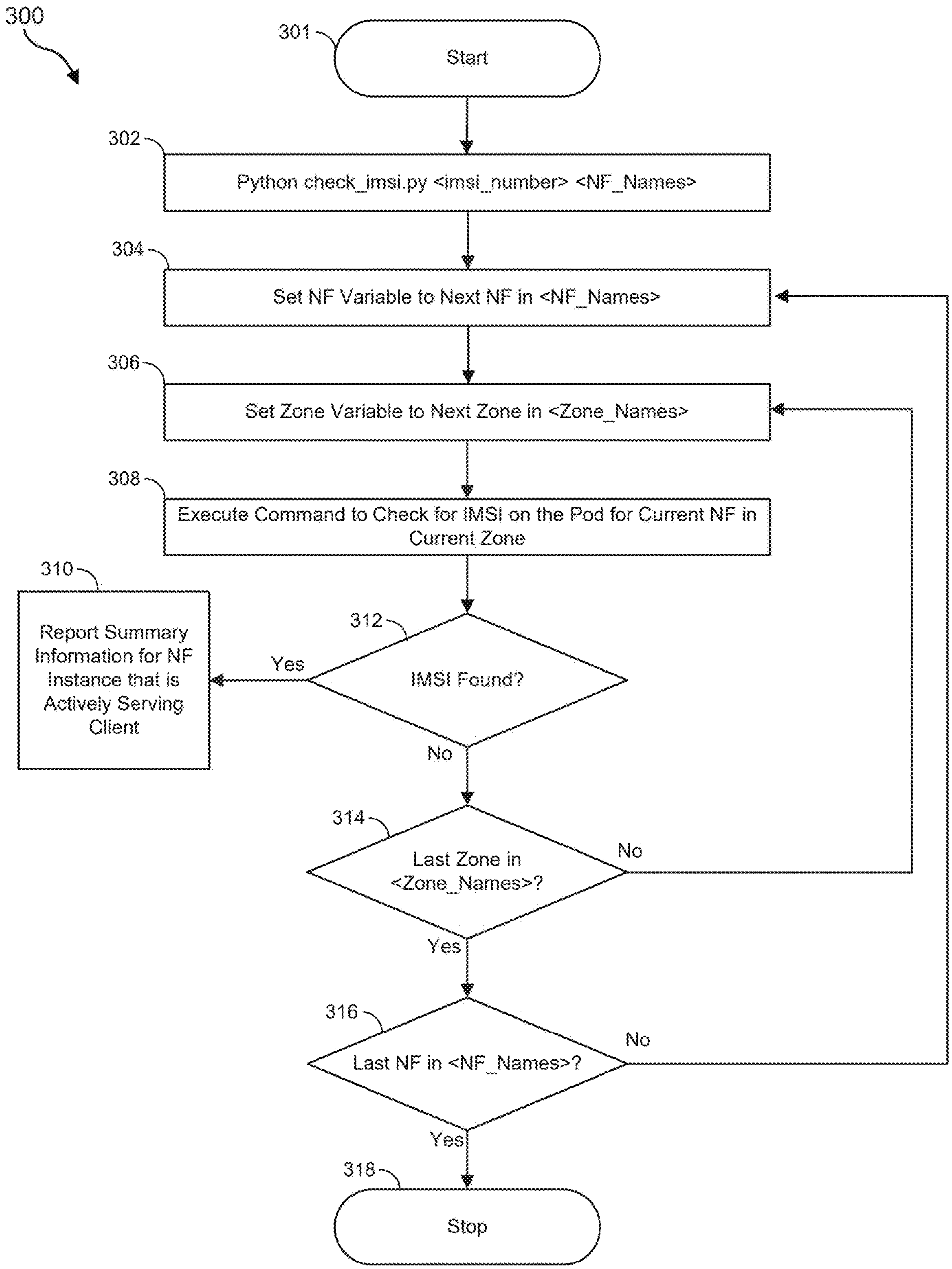
FIG. 3 shows a flow diagram for another method relating to the network function locator.

FIG. 3 shows a flow diagram for another method 300 relating to the network function locator. At step 301, method 300 may start or begin. At step 302, a corresponding programming script may be executed. In the illustrative example of this figure, the programming script may be written or executed in Python. Additionally, or alternatively, in other examples any suitable general purpose and/or high-level programming language may be used. In the illustrative example of this figure, the filename or other name of the programming script may be "check_imsi," however any suitable filename may be used. Moreover, step 302 also indicates that the programming script may include a number of input variables or parameters. For example, the programming script may accept the parameter named "imsi_number." Accordingly, the programming script may accept an international mobile subscriber identity as a parameter in the form of identifying input that identifies a particular client, customer, or subscriber of a mobile operator. In some examples, the parameter accepting the input identifying the particular client may be required or mandatory for execution of the corresponding programming script.

Additionally, or alternatively, in other examples one or more other forms of identifying input may be used. In general, mobile operators can have access to various types of data that can be used to identify subscribers directly or indirectly, even without relying on the international mobile subscriber identity ("IMSI"). A first example includes the subscriber's phone number. The most obvious identifier would be the phone number itself. Each subscriber is generally associated with a unique phone number, which can be used to track usage patterns, location information, and/or other data tied to a particular account. Second, the international mobile equipment identity ("IMEI") can be used. Each mobile device generally has a unique international mobile equipment identity, which can be used to identify the device and by extension, the subscriber. While the international mobile equipment identity may not necessarily be tied directly to personal information, the international mobile equipment identity can be used in connection with other information to identify the user. Third, subscriber identity module card information can be used. Mobile operators generally have access to data related to the subscriber identity module card in a device, including the integrated circuit card identifier ("ICCID") and the international mobile subscriber identity ("IMSI") that is stored on the subscriber identity module. While not as directly tied to personal information as the international mobile subscriber identity, this data can still be used for identification purposes. Fourth, location data and/or usage patterns can be used. Mobile operators generally collect location data from devices for various purposes, such as providing location-based services and network optimization. This data can be used to track the movements and behaviors of subscribers, indirectly identifying them based on their activity patterns. Fifth, billing information can be used. Subscriber billing information, including name, address, and/or payment details, can be stored by mobile operators for billing or account management purposes. Although this information may not generally or typically be used for network operations, it can potentially be accessed by the operator to directly identify subscribers. By leveraging a combination of the various data sources that are listed and described above, mobile operators can effectively identify subscribers without relying solely on the international mobile subscriber identity.

Step 302 of method 300 also shows that a list ("<NF-_Names>") of one or more network functions can also optionally be input as a parameter to the corresponding programming script. In various examples, method 300 can cycle through all of the network functions included within this particular list as a parameter to check which availability zone contains the instance of the corresponding network function that is actively serving a client, customer, or subscriber. In some examples, this parameter may be optional and, in a scenario where no value is submitted for this parameter, the programming script may default to using the entirety of a predefined list of network functions. According to step 302, method 300 can include executing the programming script at least in part by invoking a function that accepts the identifying input identifying the client as input and performs reporting whether the response from the pod in response to the command indicates that the pod contains the instance of the network function.

At step 304, method 300 may include setting a network function variable to the next network function that is located within the list that was identified at step 302, as discussed above. By way of illustrative example, if the list of network functions includes the AMF, SMF, and UPF (see FIG. 4A), then at step 304, method 300 may set the network function variable to a first one of the network functions that are included within this list. In various examples, the selection process for selecting the "first" or "next" item in a list may be random, semi-random, arbitrary, and/or specified according to the preferences of administrator or mobile operator.

At step 306, method 300 may include setting a zone variable to the next zone within a corresponding list of availability zones on a cloud computing platform. In general, this list can be established by the mobile operator performing method 100 and/or that is attempting to locate a particular instance of a network function that is actively serving a client. In some examples, availability zones may be grouped or aggregated within larger regions (see FIG. 2) and so method 300 may be expanded to include an outer loop over the list of regions with a nested inner loop over the availability zones that are located within each respective region. For example, at least a portion of the programming script can be repeated for each network function in the set of multiple distinct network functions such that an instance serving the client is located for each of the multiple distinct network functions. Step 306 reflects the reality that at least one instance of a corresponding network function is actively serving a client, and yet the mobile operator may not necessarily or immediately have visibility into which particular availability zone and/or pod contains that particular instance of the network function, such that method 300 effectively crawls or scans through all of the availability zones that are within a predefined set in order to search for and locate the specific instance of a network function that is actively serving the client.

Step 304 and step 306 in connection with subsequent step 314 and step 316 reflect two different programming loops that may operate in series. Nevertheless, in additional or alternative examples, those having skill in the art can readily ascertain that the order of these loops may be reversed such that the outer loop becomes the inner loop, and vice versa. Similarly, those having skill in the art can readily ascertain that, although these loops operate in series, in additional or alternative examples some part or all of the programming script may be executed in a parallel manner that leverages the benefits of parallelism. For example, rather than logging into and out of respective pods residing in respective availability zones in series, a multitude of distinct programming agents or tools may separately log into a subset or all of the respective availability zones in parallel. When operating in series, the programming script may include instructions that, for at least one zone in the set of multiple zones, logs out of the pod in the respective zone on the cloud computing platform prior to logging into a next pod for another zone in the multiple zones. In general, the intelligence associated with method 100 and/or method 300 can improve efficiency at least in part by enabling a user to further identify the zone with a single input click (e.g., the click that finalizes or executes method 100 and method 300.).

At step 306, method 300 may include executing a command to check for the international mobile subscriber identity on the pod for the current network function in the current zone. As explained above, the pod for the "current" network function may refer to the network function set at step 304, and the "current" zone may refer to the zone set at step 306.

Optionally, at some examples, in order to execute the command to check for the international mobile subscriber identity on the pod for the current network function in the current zone, method 300 may further include executing a command to first find the network function in the current zone. Additionally, or alternatively, method 300 may also further include, after finding the network function in the current zone, executing a command to identify the name or location of the pod containing the network function in the current zone. Using one or both of these items of information, method 300 may perform step 308, as discussed above. Similarly, in cases where there are multiple instances of a network function, and one of these instances of the network function is designated as "primary," then method 300 may optionally include a step to locate the primary instance of the network function such that method 300 searches for the instance of the network function that is actively serving the client among primary instances of such a network function rather than any one or more non-primary or secondary instances.

By way of illustrative example, one command that can be executed at step 308 includes a command that checks whether the client has registered with the instance of the network function in the current zone. For example, after logging into the pod, method 300 can include executing such a command to check whether the client has registered with the instance of the network function. In response, the pod can return output that indicates whether the client has registered with the instance of the network function. For example, the output can include the keyword "REGISTER" in a case where the client has registered with the instance of the network function in the current zone. Alternatively, if the client has not registered with the instance of the network function, then the output from the pod may fail to indicate the keyword "REGISTER." More generally, the output from the pod may indicate whether the client has registered with the instance of the network function in any suitable manner, such as by outputting or returning a binary flag or similar output.

Additionally, or alternatively, at step 308 another command that can be executed includes a command that checks for a number of packet data unit sessions that are associated with the instance of the network function in the current zone and that are attached to the client identified by the identifying input. At least one packet data unit session may indicate that the instance of the network function in the current zone is actively serving the client, whereas the failure to indicate at least one packet data unit session may indicate that the instance of the network function in the current zone is not actively serving the client.

At step 312, method 300 can include determining whether the international mobile subscriber identity and/or corresponding client has been located. The international mobile subscriber identity may be located at least in part by performing step 308, including executing a command to check whether a response from the pod includes a keyboard, such as the keyword "REGISTER," and/or executing a command to check whether a number of packet data unit sessions is greater than zero, as further discussed above. If the answer is yes at step 312, then method 300 may proceed to a step 310, where method 300 can include reporting one or more items of summary information for the network function instance that is actively serving the client. Alternatively, if the answer is no at step 312, then method 300 may proceed to step 314, at which point method 300 may check whether the current zone is the last zone within the list of zones identified at step 306 and discussed above. If the answer is no at step 314, then method 300 may proceed to step 306 to perform a partial repetition in a loop, as discussed above. If the answer is yes at step 314, then method 300 may proceed to a step 316, at which point method 300 may include checking whether the current network function is the last network function within the list of network functions that was identified at step 304 as discussed above. If the answer is no at step 316, then method 300 may proceed to step 304 to perform a partial repetition in a loop, as discussed above. Alternatively, if the answer is yes at step 316, then method 300 may proceed to step 318, at which point method 300 may stop or conclude.

Figure 4A:
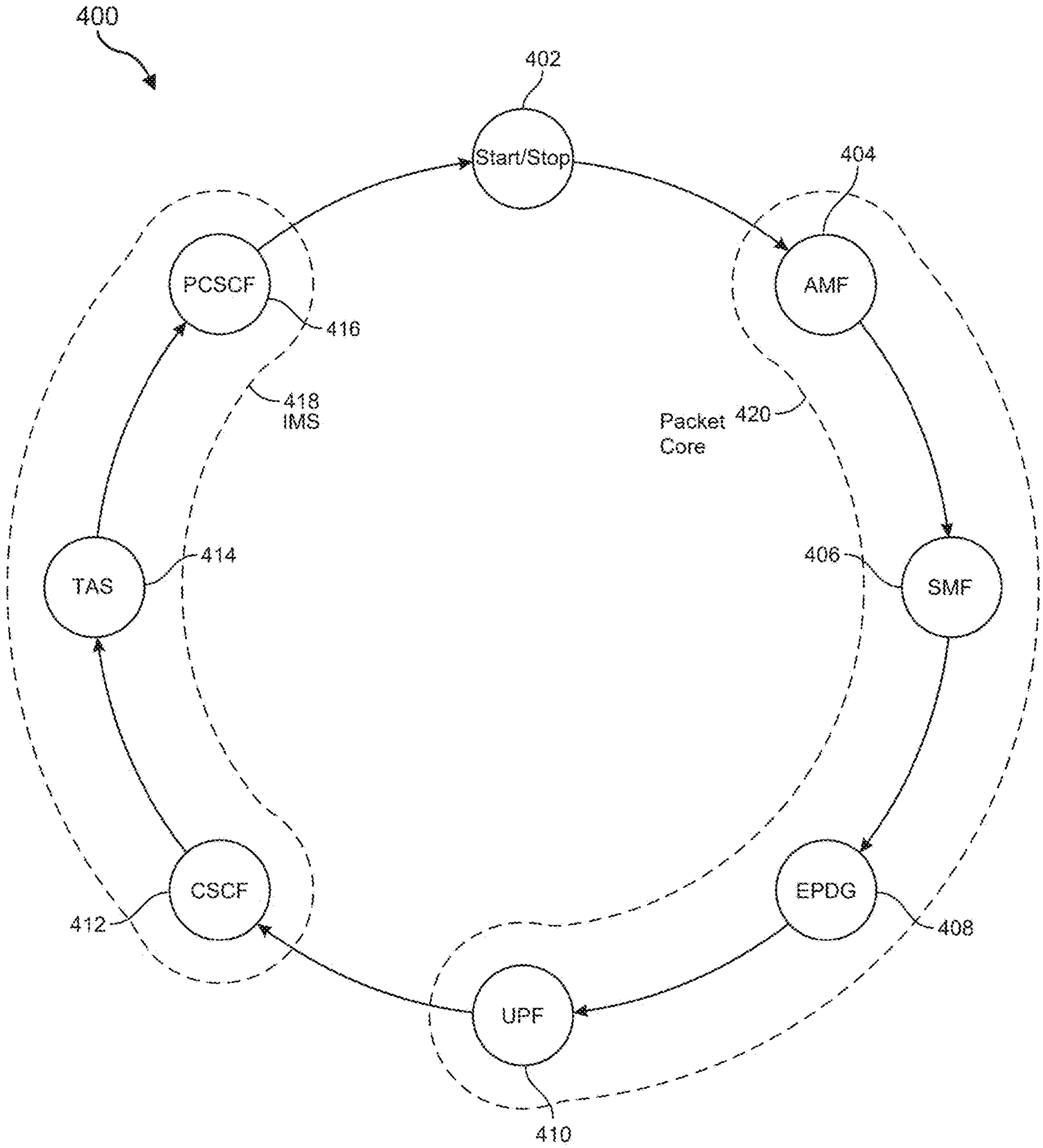
FIG. 4A shows a diagram indicating a cycle between different network functions executing on a cloud computing platform.

FIG. 4A shows a diagram 400 indicating a cycle between different network functions executing on a cloud computing platform. As shown, diagram 400 includes a start/stop step 402, an access and mobility function 404, a session management function 406, an evolved packet data gateway 408, and a user plane function 410. These instances or types of network functions may be included within a fifth-generation or beyond packet core 420. Similarly, diagram 400 also includes a call session control function 412, a telephony application server 414, and/or a proxy call session control function 416, and these instances or types of network functions may be included within the Internet Protocol multimedia subsystem 418. Consistent with diagram 400, method 100 and/or method 300 may cycle through a set or subset of network functions, including all or part of the network functions shown within diagram 400. As further discussed above, which specific network functions are searched for and/or the order in which to search them (e.g., in parallel or in series, etc.) may be specified according to the preferences of an administrator or the mobile operator.

Figure 4B:
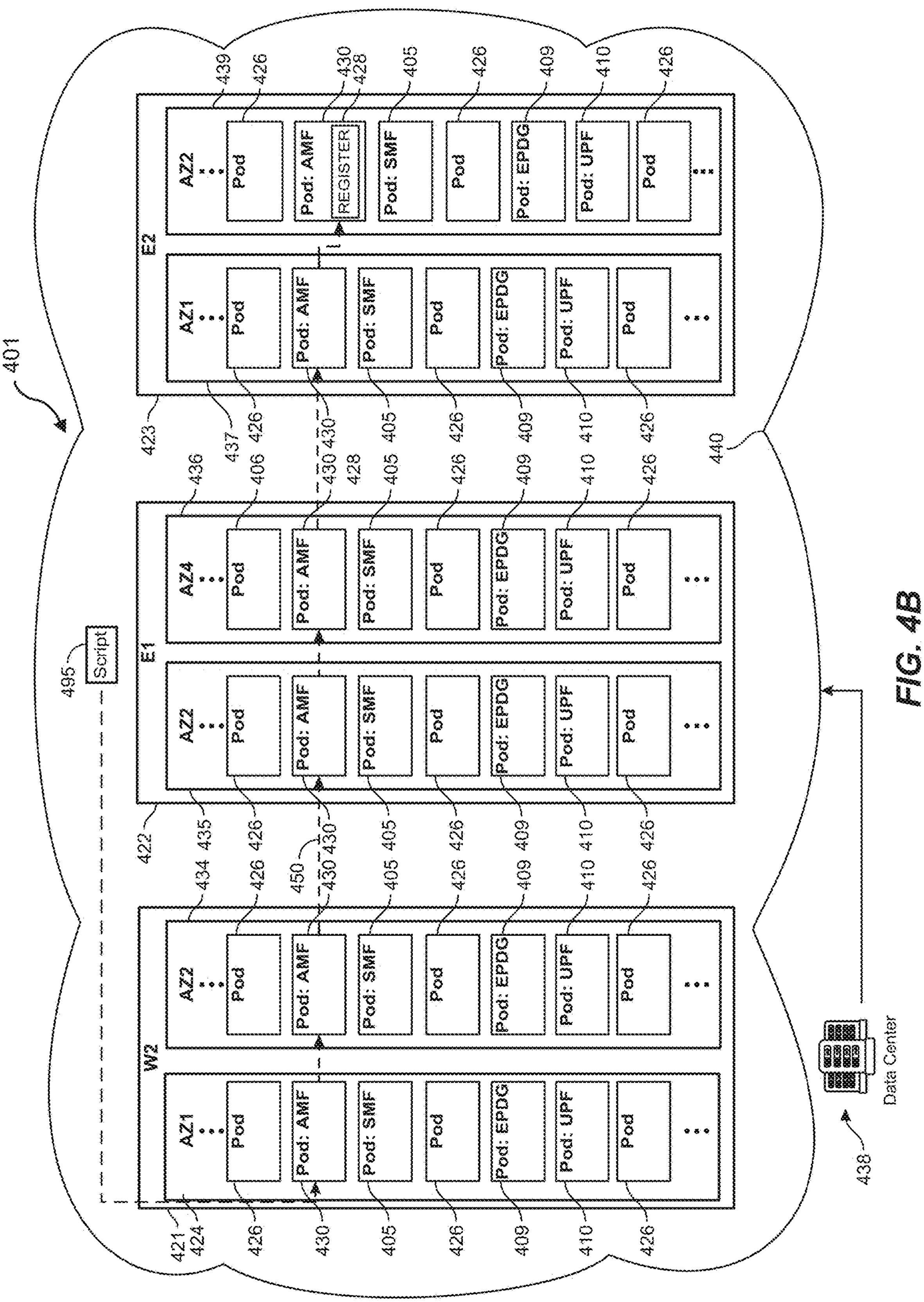
FIG. 4B shows a diagram indicating how a programming script can be executed with respect to different network functions executing on a cloud computing platform.

FIG. 4B shows a diagram 401 indicating how a programming script can be executed with respect to different network functions executing on a cloud computing platform 440 that is hosted at a data center 438. As shown within diagram 401, a mobile operator may have partnered with a technology company implementing the cloud computing platform, or otherwise leveraged or subscribed to services provided by the cloud computing platform, such that some part or all of a fifth-generation or beyond cellular network is implemented on resources of the cloud computing platform. By way of illustrative example, diagram 401 shows that the mobile operator has implemented at least part of its cellular network core on all or part of three respective regions within the cloud computing platform. These three regions include a region 421, a region 422, and a region 423, which are further designated as W2, E1, and/or E2. As further discussed above, these regions may form a subset of all of the regions provided by the cloud computing platform (see FIG. 2). Moreover, in some examples, the mobile operator may only leverage or utilize a subset of availability zones that are provided within a corresponding respective region. In the illustrative example of diagram 401, the mobile operator may be utilizing resources within two availability zones within region 422, which are designated as "AZ2" and "AZ4" without necessarily utilizing resources within one or more remaining availability zones within the corresponding region 422. In particular, diagram 401 shows that region 421 includes an availability zone 424 and an availability zone 434, region 422 includes an availability zone 435 and an availability zone 436, and region 423 includes an availability zone 437 and an availability zone 439. Accordingly, in the illustrative example of diagram 401, the relevant availability zones include w2az1, w2az2, e1az2, e1az4, e2az1, and e2az2.

Diagram 401 also includes a traversal indicator 450, which highlights the order in which a programming script, such as a script 495, may crawl, scan, and/or traverse the various pods within the availability zones of these regions, as discussed above. In particular, diagram 401 shows that each availability zone may include a multitude of instances of pods, including instances of a generic pod 426 and/or instances of pods that are specific to, or designated for, particular types of network functions. These latter instances of pods may include instances of an access and mobility function pod 430, a session management function pod 405, and/or an evolved packet data gateway pod 409, as shown.

From among the various instances of the various types of pods for network functions throughout cloud computing platform 440, only one instance or a subset of instances may be actively serving a client at a particular time. By way of illustrative example, although availability zone 424, availability zone 434, availability zone 435, availability zone 436, availability zone 437, and availability zone 439 all include an instance of access and mobility function pod 430, only one of these instances may actually be actively serving a particular client at a particular time.

In view of the above, diagram 401 illustrates how script 495 may execute method 100 and/or method 300. Script 495 may be executed with an input parameter identifying a particular mobile client, customer, or subscriber, as discussed above. For example, script 495 may be executed with an input parameter specifying an international mobile subscriber identity. Additionally, or alternatively, script 495 may be executed with an input parameter specifying a list or set of network functions such that script 495 identifies which one or more instances of these particular network functions are actively serving the client. In the illustrative example of diagram 401, the input parameter may specify a list of network functions that includes only a single network function, the access and mobility function. Accordingly, traversal indicator 450 may begin at the instance of access and mobility function pod 430 that is located within availability zone 424 within region 421, as shown. Diagram 401 indicates that each instance of access and mobility function pod 430 fails to indicate the keyword "REGISTER" except for the instance of access and mobility function pod 430 that is located within availability zone 439 within region 423. Diagram 401 illustrates how this instance of access and mobility function pod 430 includes an instance of keyword 428, in the form of "REGISTER." This graphical orientation indicates that access and mobility function pod 430 within availability zone 439 responded to the command executed as part of method 100 with a response that includes the keyword "REGISTER," as further discussed above. In other words, keyword 428 in diagram 401 helps illustrate how, in various examples, reporting whether the response from the pod in response to the command indicates that the pod contains the instance of the network function that is actively serving the client can include defining a character pattern including the keyword REGISTER and/or checking whether the response includes the character pattern.

Additionally, or alternatively, script 495 may search for particular a network function (e.g., the other network functions in diagram 400 except for the access and mobility function) by checking for a positive number of packet data unit sessions, as further discussed above. Accordingly, by following traversal indicator 450, which traces the steps of script 495, the reader can ascertain how script 495 can iteratively search through the various pods for a particular type of network function in a search to locate the particular instance of the network function that is actively serving the client. Moreover, although the illustrative example of diagram 401 focuses upon a sequential or iterative search, in other examples some part or all of the searching procedure may be performed in parallel, as discussed previously.

Figure 5:
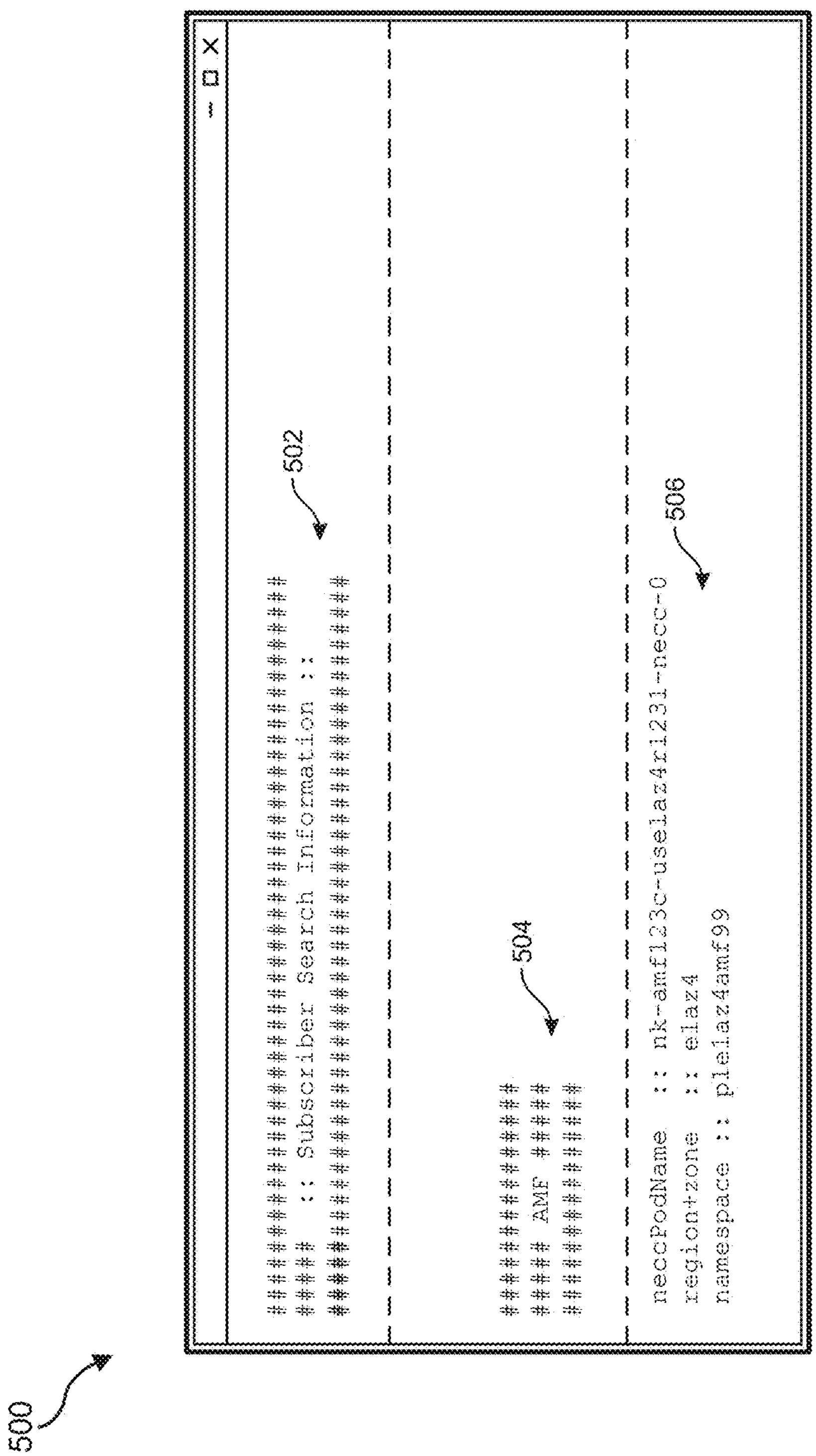
FIG. 5 shows a diagram of a graphical user interface showing output locating an example of a network function.

FIG. 5 shows a diagram 500 of a graphical user interface showing output locating an example of a network function. In particular, diagram 500 includes a headline 502, a network function indicator 504, and corresponding output 506. Headline 502 may identify the general purpose or functioning of the programming script, which can correspond to searching for subscriber information. Network function indicator 504 may identify the type of the particular network function that corresponds to corresponding output 506. In the illustrative example of diagram 500, the particular type of network function indicated by network function indicator 504 corresponds to the access and mobility function. Lastly, corresponding output 506 identifies the name of the pod containing the instance of the network function that is actively serving the client, the region and/or availability zone in which this particular pod is located, and/or a corresponding namespace, as shown. Accordingly, diagram 500 illustrates an example of how outputting the result in method 100 can include outputting a namespace for the network function, a particular zone for the network function, or a name of a particular pod containing the network function.

Figure 6:
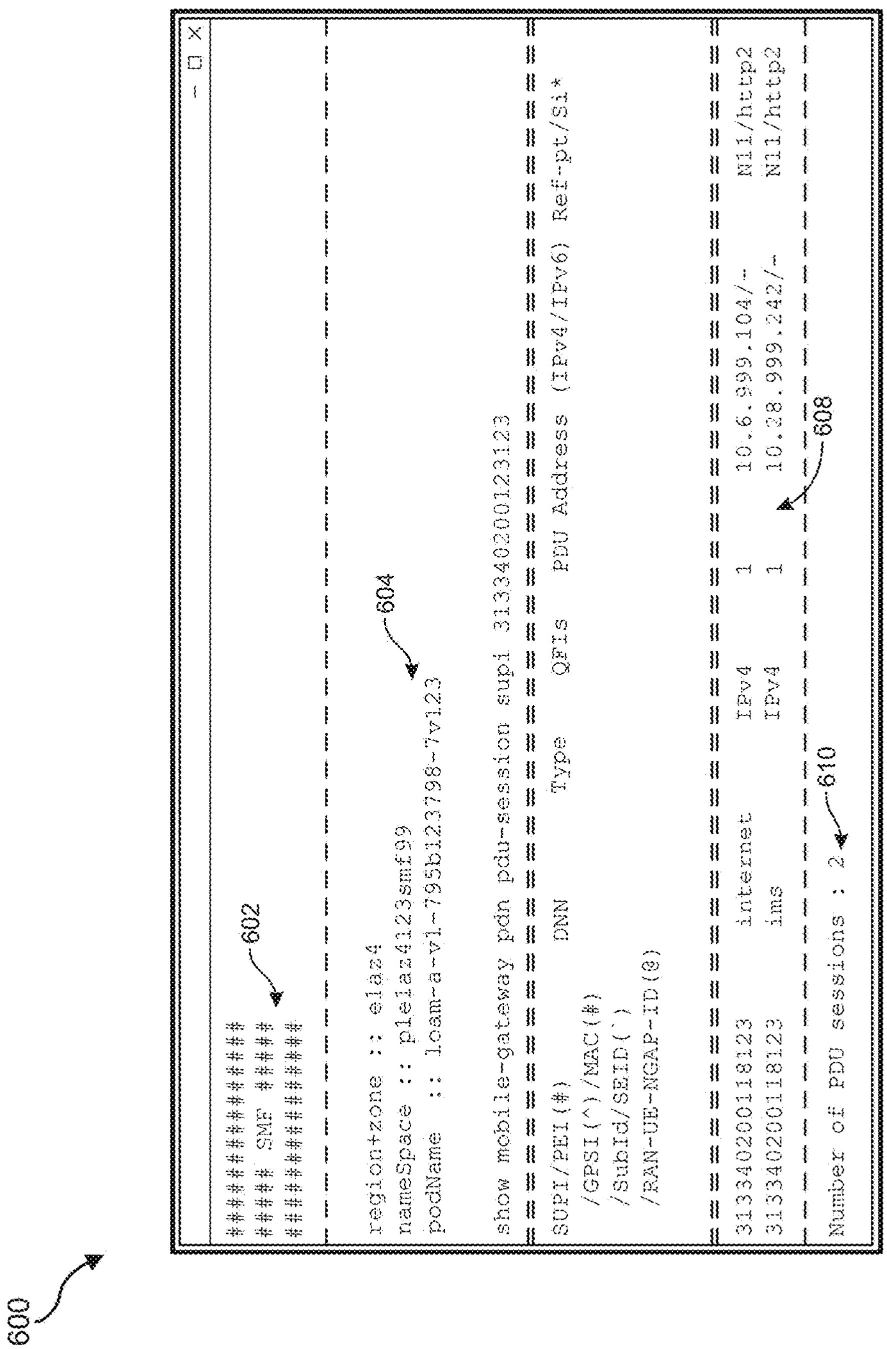
FIG. 6 shows a diagram of the graphical user interface showing output locating another example network function.
Figure 7:
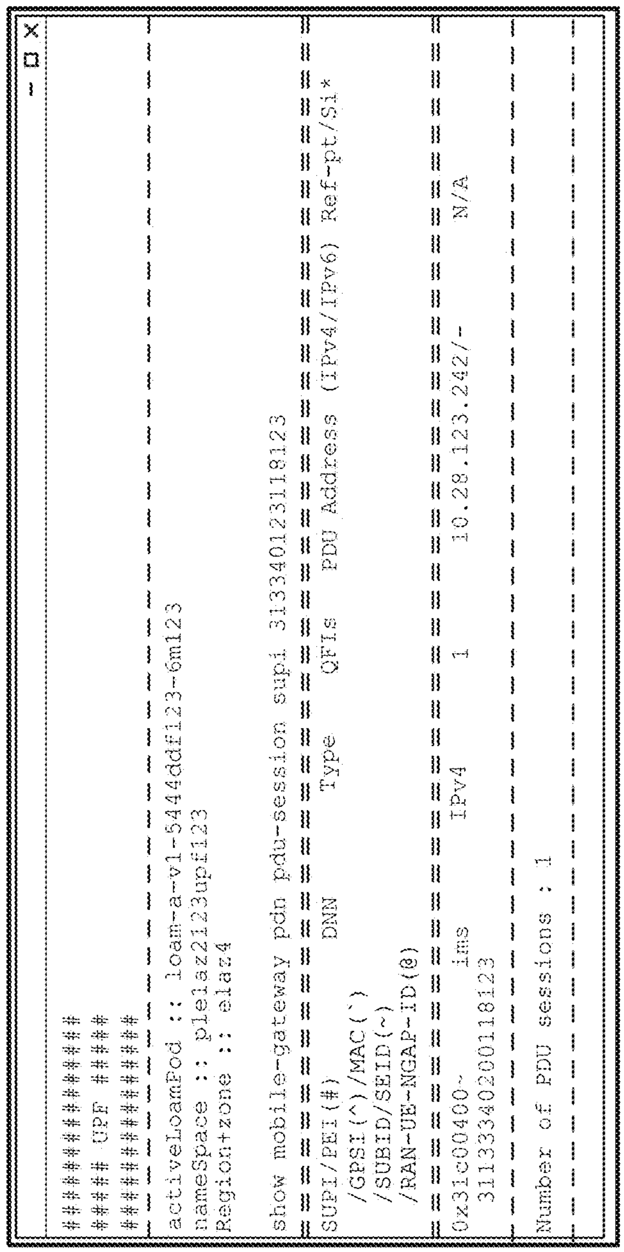
FIG. 7 shows a diagram of the graphical user interface showing output locating another example network function.

FIG. 6 shows a diagram 600 of the graphical user interface showing output locating another example network function. Diagram 600 is substantially parallel to diagram 500, except that diagram 600 focuses upon the session management function rather than the access and mobility function. Accordingly, a network function indicator 602 identifies the session management function. Corresponding output 604 identifies the region and/or zone containing the instance of this particular network function that is currently or actively serving the client. Corresponding output 604 also identifies the corresponding namespace and/or pod name, as shown. Moreover, diagram 600 includes a section 608 which details information regarding two different packet data unit sessions that are associated with Internet traffic and with Internet protocol multimedia subsystem traffic, respectively. Accordingly, diagram 600 also includes a section 610 that further specifies the number of packet data unit sessions. Because the number of packet data unit sessions within this particular example is greater than zero, then the corresponding programming script can conclude that the instance of the session management function within this particular region and/or availability zone is actively serving the client, as further. Similarly, FIG. 7 shows a diagram 700 that substantially parallels diagram 600, except that diagram 700 focuses upon the user plane function rather than the session management function.

Figure 8:
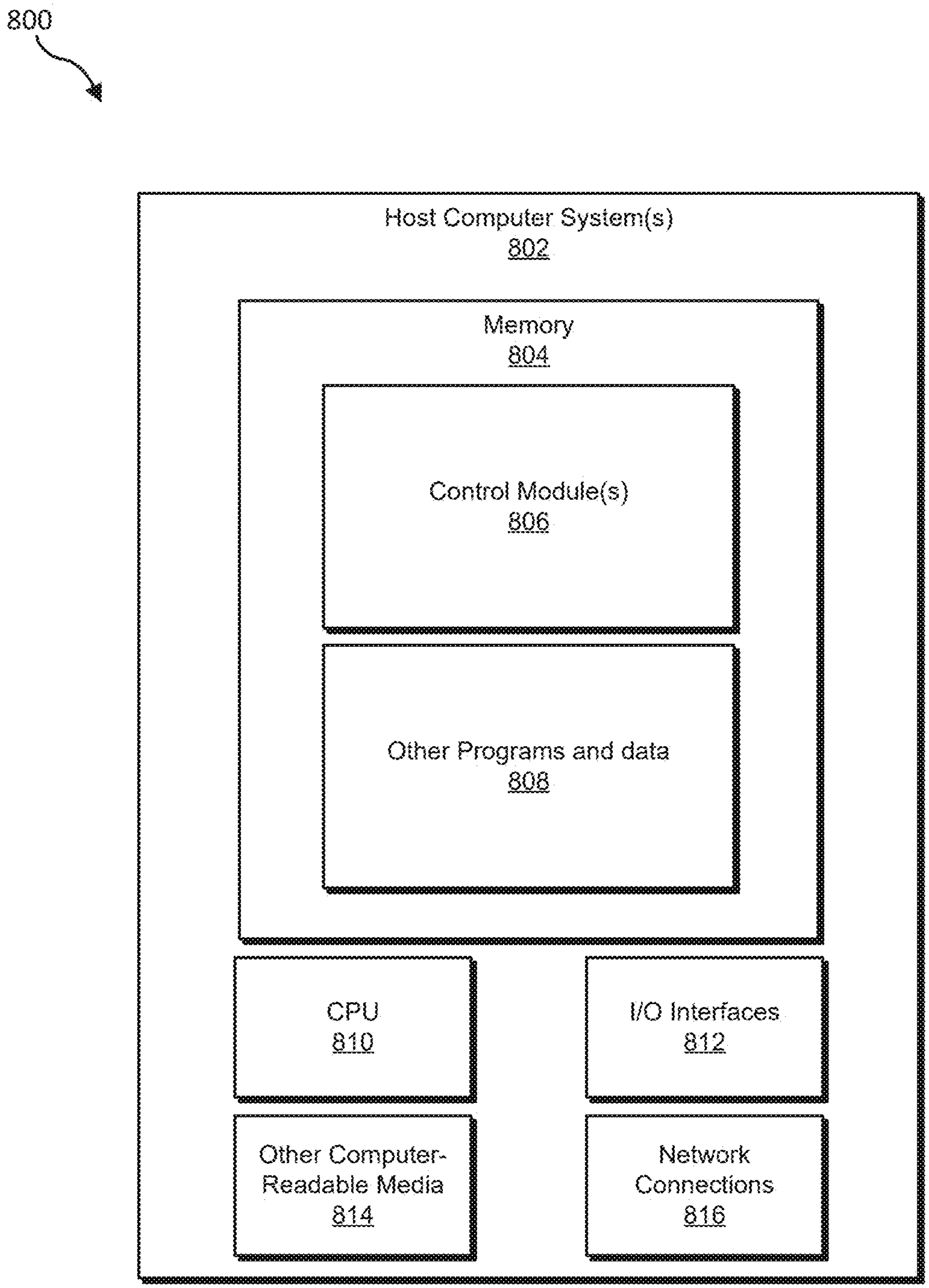
FIG. 8 shows a diagram of an example computing system that may facilitate the performance of one or more of the methods described herein.

FIG. 8 shows a system diagram that describes an example implementation of a computing system(s) for implementing embodiments described herein. The functionality described herein can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they are agnostic to the underlying cloud infrastructure, allowing higher deployment agility and flexibility. However, FIG. 8 illustrates an example of underlying hardware on which such software and functionality may be hosted and/or implemented.

In particular, shown is example host computer system(s) 801. For example, such computer system(s) 801 may execute a scripting application, or other software application, as further discussed above, and/or to perform one or more of the other methods described herein. In some embodiments, one or more special-purpose computing systems may be used to implement the functionality described herein. Accordingly, various embodiments described herein may be implemented in software, hardware, firmware, or in some combination thereof. Host computer system(s) 802 may include memory 804, one or more central processing units (CPUs) 810, I/O interfaces 812, other computer-readable media 814, and network connections 816.

Memory 804 may include one or more various types of non-volatile and/or volatile storage technologies. Examples of memory 804 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 804 may be utilized to store information, including computer-readable instructions that are utilized by CPU 814 to perform actions, including those of embodiments described herein.

Memory 804 may have stored thereon control module(s) 806. The control module(s) 806 may be configured to implement and/or perform some or all of the functions of the systems or components described herein. Memory 804 may also store other programs and data 808, which may include rules, databases, application programming interfaces (APIs), software containers, nodes, pods, clusters, node groups, control planes, software defined data centers (SDDCs), microservices, virtualized environments, software platforms, cloud computing service software, network management software, network orchestrator software, network functions (NF), artificial intelligence (AI) or machine learning (ML) programs or models to perform the functionality described herein, user interfaces, operating systems, other network management functions, other NFs, etc.

Network connections 816 are configured to communicate with other computing devices to facilitate the functionality described herein. In various embodiments, the network connections 816 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 812 may include a video interface, other data input or output interfaces, or the like. Other computer-readable media 814 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed:

1. A method comprising:

receiving identifying input identifying a client receiving telecommunication service through a cloud-native mobile network that is operated by a mobile operator and that is implemented at least in part through a cloud computing platform that divides itself into at least a plurality of different zones;

executing a programming script using the identifying input to further identify a zone, from among the plurality of zones, that contains an instance of a network function that is implemented on the cloud computing platform and that is actively serving the client; and outputting a result of executing the programming script such that the mobile operator is enabled to further identify the zone, from among the plurality of zones, that contains the instance of the network function that is implemented on the cloud computing platform and that is actively serving the client;

wherein the programming script identifies the zone by performing, for each respective zone in a set of multiple zones from the plurality of zones:

logging into a pod for the network function in the respective zone on the cloud computing platform;

executing on the pod a command at least in part by referencing the identifying input identifying the client; and reporting whether a response from the pod in response to the command indicates that the pod contains the instance of the network function that is actively serving the client such that the instance of the network function is located.

2. The method of claim 1, wherein the identifying input identifying the client receiving telecommunication service comprises an international mobile subscriber identity.

3. The method of claim 1, wherein:

the programming script accepts as input a set of multiple distinct network functions; and at least a portion of the programming script is repeated for each network function in the set of multiple distinct network functions such that an instance serving the client is located for each of the multiple distinct network functions.

4. The method of claim 1, wherein the network function is part of the Internet Protocol multimedia subsystem.

5. The method of claim 4, wherein the network function comprises a call session control function, a proxy call session control function, or a telephony application server.

6. The method of claim 1, wherein the network function is part of the 5G core.

7. The method of claim 6, wherein the network function comprises an access and mobility management function, a user plane function, an evolved packet data gateway, a subscriber data management, or a session management function.

8. The method of claim 1, wherein executing the programming script comprises invoking a function that accepts the identifying input identifying the client as input and performs reporting whether the response from the pod in response to the command indicates that the pod contains the instance of the network function that is actively serving the client such that the instance of the network function is located.

9. The method of claim 1, further comprising, for at least one zone in the set of multiple zones, logging out of the pod in the respective zone on the cloud computing platform prior to logging into a next pod for another zone in the multiple zones.

10. The method of claim 1, wherein the zones comprise at least two of w2az1, w2az2, e1az2, e1az4, e2az1, and e2az2.

11. The method of claim 1, wherein outputting the result comprises outputting a namespace for the network function, a particular zone for the network function, or a name of a particular pod containing the network function.

12. The method of claim 1, wherein reporting whether the response from the pod in response to the command indicates that the pod contains the instance of the network function that is actively serving the client comprises defining a character pattern including the keyword REGISTER.

13. The method of claim 12, wherein reporting whether the response from the pod in response to the command indicates that the pod contains the instance of the network function that is actively serving the client comprises checking whether the response includes the character pattern.

14. The method of claim 1, wherein executing the programming script enables a user to further identify the zone with a single input click.

15. The method of claim 1, wherein the programming script identifies the zone by performing, for each respective zone in the set of multiple zones from the plurality of zones, logging out of the pod for the respective network function in the respective zone.

16. The method of claim 1, wherein the command checks for a number of packet data unit sessions for the client connected to the pod for the network function.

17. A system comprising:

at least one physical computing processor of a computing device; and a non-transitory computer-readable medium that has instructions stored thereon that, when executed by the at least one physical computing processor, cause the computing device to perform operations comprising:

receiving identifying input identifying a client receiving telecommunication service through a cloud-native mobile network that is operated by a mobile operator and that is implemented at least in part through a cloud computing platform that divides itself into at least a plurality of different zones;

executing a programming script using the identifying input to further identify a zone, from among the plurality of zones, that contains an instance of a network function that is implemented on the cloud computing platform and that is actively serving the client; and outputting a result of executing the programming script such that the mobile operator is enabled to further identify the zone, from among the plurality of zones, that contains the instance of the network function that is implemented on the cloud computing platform and that is actively serving the client;

wherein the programming script identifies the zone by performing, for each respective zone in a set of multiple zones from the plurality of zones:

logging into a pod for the network function in the respective zone on the cloud computing platform;

executing on the pod a command at least in part by referencing the identifying input identifying the client; and reporting whether a response from the pod in response to the command indicates that the pod contains the instance of the network function that is actively serving the client such that the instance of the network function is located.

18. The system of claim 17, wherein the identifying input identifying the client receiving telecommunication service comprises an international mobile subscriber identity.

19. A non-transitory computer-readable medium that has instructions stored thereon that, when executed by at least one physical computing processor, cause a computing device to perform operations comprising:

receiving identifying input identifying a client receiving telecommunication service through a cloud-native mobile network that is operated by a mobile operator and that is implemented at least in part through a cloud computing platform that divides itself into at least a plurality of different zones;

executing a programming script using the identifying input to further identify a zone, from among the plurality of zones, that contains an instance of a network function that is implemented on the cloud computing platform and that is actively serving the client; and outputting a result of executing the programming script such that the mobile operator is enabled to further identify the zone, from among the plurality of zones, that contains the instance of the network function that is implemented on the cloud computing platform and that is actively serving the client;

wherein the programming script identifies the zone by performing, for each respective zone in a set of multiple zones from the plurality of zones:

logging into a pod for the network function in the respective zone on the cloud computing platform;

executing on the pod a command at least in part by referencing the identifying input identifying the client; and reporting whether a response from the pod in response to the command indicates that the pod contains the instance of the network function that is actively serving the client such that the instance of the network function is located.

20. The non-transitory computer-readable medium of claim 19, wherein the identifying input identifying the client receiving telecommunication service comprises an international mobile subscriber identity.

* * * * *